(12) United States Patent
Andreev et al.

(10) Patent No.: US 11,095,582 B2
(45) Date of Patent: Aug. 17, 2021

(54) SYSTEMS AND METHODS FOR SUPPLEMENTING REAL-TIME EXCHANGES OF INSTANT MESSAGES WITH AUTOMATICALLY UPDATEABLE CONTENT

(71) Applicant: VONAGE AMERICA INC., Holmdel, NJ (US)

(72) Inventors: Alexandra Andreev, Akko (IL); Iliya Barenboim, Ramat Gan (IL); Dany Orr, Tel-Aviv (IL); Yair Bahar, Tel-Aviv (IL); Tomer Goshen, Afula (IL); Joseph Pagnotta, Manasquan, NJ (US)

(73) Assignee: Vonage America LLC, Holmdel, NJ (US)

( * ) Notice: Subject to any disclaimer, the term of this patent is extended or adjusted under 35 U.S.C. 154(b) by 0 days.

(21) Appl. No.: 16/689,310

(22) Filed: Nov. 20, 2019

(65) Prior Publication Data

US 2020/0099638 A1 Mar. 26, 2020

Related U.S. Application Data

(63) Continuation of application No. 15/082,146, filed on Mar. 28, 2016, now Pat. No. 10,516,635.

(Continued)

(51) Int. Cl.
*G06F 3/048* (2013.01)
*H04L 12/58* (2006.01)
(Continued)

(52) U.S. Cl.
CPC ........ *H04L 51/046* (2013.01); *G06F 3/04842* (2013.01); *G06F 3/04886* (2013.01); *H04L 51/02* (2013.01); *H04L 65/1069* (2013.01)

(58) Field of Classification Search
CPC ... H04L 51/046; H04L 51/02; H04L 65/1069; G06F 3/04842; G06F 3/04886
(Continued)

(56) References Cited

U.S. PATENT DOCUMENTS 7,779,076 B2 8/2010 Heikes et al.
7,877,697 B2 1/2011 Canfield et al.
(Continued)

FOREIGN PATENT DOCUMENTS

EP 1596546 A2 11/2005

OTHER PUBLICATIONS

International Search Report and Written Opinion dated Jul. 1, 2016 for Application No. PCT/US2016/024429, 10 pages.

*Primary Examiner* — David Phantana-angkool
(74) *Attorney, Agent, or Firm* — Moser Taboada; Joseph Pagnotta

(57) ABSTRACT

A method of providing automatically updated content a messaging session is disclosed. The method comprising exchanging, via a user interface of a messaging system on a first user device, messages with one or more other user devices in the messaging session, wherein the user interface includes a first region for exchanging messages; initiating display of a plurality of selectable messaging objects that represent supplementary content that is periodically updated during the messaging session; receiving a first user selection of one of the displayed messaging objects to include during the messaging session; and embedding the supplementary content associated with the selected messaging object within the messaging session.

22 Claims, 6 Drawing Sheets

Related U.S. Application Data

(60) Provisional application No. 62/138,614, filed on Mar. 26, 2015.

(51) Int. Cl.
  *G06F 3/0484* (2013.01)
  *G06F 3/0488* (2013.01)
  *H04L 29/06* (2006.01)

(58) Field of Classification Search
  USPC .......................................................... 715/753
  See application file for complete search history.

(56) References Cited

U.S. PATENT DOCUMENTS

| | | | |
|---|---|---|---|
| 7,941,493 B2 | 5/2011 | Daniell et al. | |
| 8,020,105 B1 | 9/2011 | Lemay et al. | |
| 8,145,257 B2 | 3/2012 | Yim et al. | |
| 8,285,785 B2 | 10/2012 | Ekholm et al. | |
| 8,375,325 B2 | 2/2013 | Wuttke | |
| 8,762,475 B2 | 6/2014 | Cheung et al. | |
| 8,782,133 B2 | 7/2014 | Coutts | |
| 8,965,976 B2 * | 2/2015 | Beslic | H04L 12/1818 709/204 |
| 9,021,372 B2 | 4/2015 | Anderson | |
| 9,544,746 B2 | 1/2017 | Lynn et al. | |
| 9,565,224 B1 | 2/2017 | Lewis et al. | |
| 9,633,399 B2 | 4/2017 | George et al. | |
| 9,721,024 B2 | 8/2017 | Sa et al. | |
| 9,742,715 B1 | 8/2017 | Chavez et al. | |
| 9,830,050 B2 | 11/2017 | Dunn et al. | |
| 9,935,911 B2 | 4/2018 | Gal-Tzur et al. | |
| 10,025,475 B1 * | 7/2018 | Cohen | H04L 51/04 |
| 10,389,977 B1 * | 8/2019 | Van Os | H04L 51/043 |
| 10,516,635 B2 * | 12/2019 | Andreev | H04L 51/046 |
| 10,725,626 B2 * | 7/2020 | Meixner | G06Q 10/103 |
| 10,771,270 B2 * | 9/2020 | Sullivan | H04L 12/1822 |
| 2005/0086309 A1 | 4/2005 | Galli et al. | |
| 2005/0268237 A1 | 12/2005 | Crane et al. | |
| 2006/0173961 A1 | 8/2006 | Turski et al. | |
| 2007/0005719 A1 | 1/2007 | Szeto | |
| 2009/0094343 A1 | 4/2009 | Mehrotra et al. | |
| 2009/0094653 A1 | 4/2009 | Shields | |
| 2009/0106686 A1 | 4/2009 | Shin et al. | |
| 2009/0158176 A1 | 6/2009 | Kalaboukis et al. | |
| 2012/0317499 A1 | 12/2012 | Shen | |
| 2013/0260802 A1 | 10/2013 | Mayblum | |
| 2014/0173459 A1 * | 6/2014 | Gaiser | H04L 67/22 715/753 |
| 2014/0173460 A1 * | 6/2014 | Kim | G06F 40/131 715/753 |
| 2014/0282101 A1 * | 9/2014 | Beechuk | G06Q 50/01 715/753 |
| 2015/0026597 A1 * | 1/2015 | Gadamsetty | H04L 51/046 715/753 |
| 2017/0353414 A1 * | 12/2017 | Ertmann | H04L 51/32 |
| 2021/0084137 A1 * | 3/2021 | Kang | G07C 9/00309 |

* cited by examiner

SYSTEMS AND METHODS FOR SUPPLEMENTING REAL-TIME EXCHANGES OF INSTANT MESSAGES WITH AUTOMATICALLY UPDATEABLE CONTENT

CROSS-REFERENCE TO RELATED APPLICATIONS

This application is a continuation of co-pending U.S. patent application Ser. No. 15/082,146 filed Mar. 28, 2016, which claims benefit of U.S. Provisional Patent Application Ser. No. 62/138,614, filed Mar. 26, 2015. Each of the aforementioned patent applications are herein incorporated in its entirety by reference.

BACKGROUND

Field

Embodiments consistent with the present invention generally relate to systems and methods for allowing users to supplement exchanges of instant messages, which collectively comprise a real time conversation, with automatically updateable content.

Description of the Related Art

Users of computing devices (e.g., laptops, cellular phones, and personal digital assistants) often need to communicate in real time. A common form of real-time communications is provided by instant messaging services. An instant messaging service allows participants at endpoints to send messages and have them received within a second or two by the other participants in a conversation. The receiving participants can then send responsive messages to the other participants in a similar manner. To be effective, a real-time conversation relies on the participants becoming aware of, reviewing, and responding to received messages very quickly. This quick response is in contrast to conventional electronic mail systems in which the recipients of electronic mail messages respond to messages at their convenience.

To support real-time communications, communications applications typically need to establish and manage connections (also referred to as sessions or dialogs) between computing devices. A session is a set of interactions between computing devices that occurs over a period of time. As an example, real-time communications applications such as MESSENGER or Voice over Internet Protocol ("VoIP") establish sessions between communicating devices on behalf of users. The communication applications may establish an instant messaging (IM) session using any suitable IM protocol. One suitable IM protocol is SIP SIMPLE, the Session Initiation Protocol (SIP) package for Presence and Instant messaging. SIP SIMPLE is defined by the IETF and used in the IMS platform defined by the 3GPP forum (see http://tools.ietf.org/html/draft-ietf-simple-simple-06).
Another example is Extensible Messaging and Presence Protocol (XMPP), a communications protocol for message-oriented middleware based on XML (Extensible Markup Language).

Most real-time communications take place using plain text, though sometimes the text may include one or more embedded hypertext markup language (HTML) links. However, the use of embedded links to invoke additional services removes the receiving participant from the flow of the conversation when viewing such hyperlinks so that they miss additional messages from the sending participant or have to manage multiple windows to follow the sending participants intended purpose for sending the application content.

A need therefore exists for systems and methods by which an exchange of instant messages between two or more participants can be automatically supplemented with additional content that is updated over the course of the exchange.

SUMMARY

A method and system for embedding automatically updateable content in the context of a real-time conversation between two or more participants is provided.

In an embodiment, a real-time communication system receives an instruction to invoke an automatic content updating capability within the context of a real time conversation between two or more participants. The real-time communication system detects that one of the participants has invoked the automatic content updating capability, and determines the service responsible for providing the data which will be used to perform the updates. The real-time communication system uses the data made available by the service to refresh a display associated with the real-time conversation, enabling the participants to discuss the updates as part of an ongoing conversation.

In another embodiment, a user interface of an instant messaging system on a computing device includes a first region for presenting exchanged instant messages. An instant messaging session is commenced in the first region, by which a first user exchanges instant messages with one or more other users. A list of services is displayed through which data is available for use in updating the content presented. Upon the first user selecting one of the displayed services, the selection being made while the first user is communicating with one or more other users in the first region, periodically updated content is visually presented to the first and the one or more other users.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other and further embodiments of the present invention are described below.

BRIEF DESCRIPTION OF THE DRAWINGS

So that the manner in which the above recited features of embodiments of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
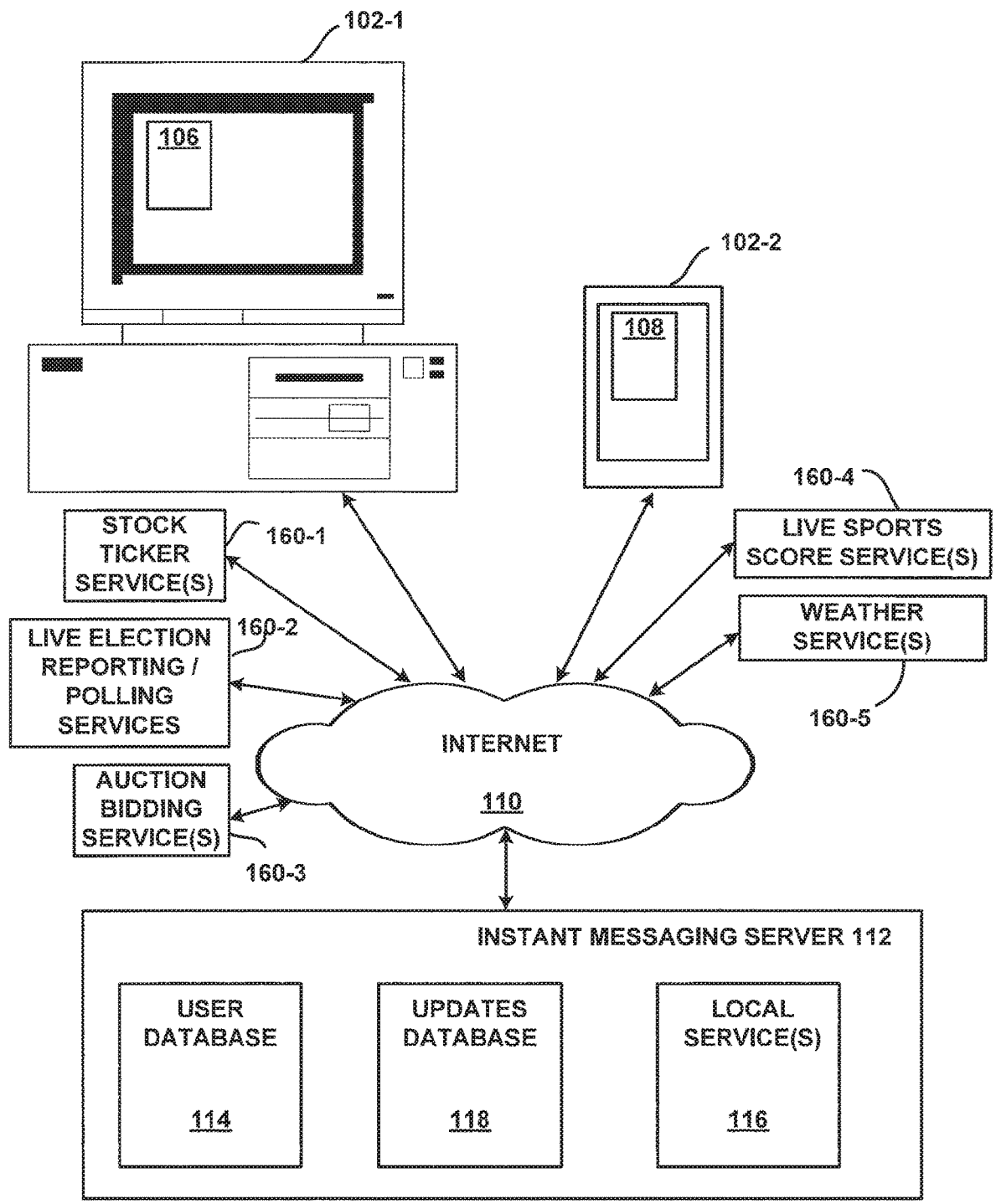
FIG. 1 is a block diagram depicting a communication system configured to enable a participant in an exchange of messages to invoke an automatic content updating capability within the context of a real time conversation with one or more other participants, according to one or more embodiments of the invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention include a system and method for embedding automatically updateable content in the context of a real-time conversation between two or more participants.

Various embodiments of systems and methods for embedding automatically updateable content in the context of a real-time conversation between two or more participants are provided below. In the following detailed description, numerous specific details are set forth to provide a thorough understanding of the claimed subject matter. However, it will be understood by those skilled in the art that claimed subject matter may be practiced without these specific details.

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 depicts a block diagram of a communication system 100 configured to enable a participant in a message exchange to invoke an automatic content updating capability within the context of a real time conversation with one or more other participants, according to one or more embodiments of the invention. Terminals 102-1 and 102-2 are each configured to run an instant messaging client application, such as MSN Messenger, AOL® Instant Messenger™ or Yahoo Messenger. Terminals 102-1 and 102-2 may be implemented with computer workstations, personal digital assistants (PDAs), mobile telephones or any other devices capable of exchanging instant messages. Terminals 102-1 and 102-2 display user interfaces 106 and 108 respectively. User interfaces 106 and 108 may be used to perform such functions as creating, editing, and replying to instant messages as part of a real-time conversation, attaching file attachments which may include media files and documents of interest to members of a chat group, and presenting automatically updated content as described in detail below. There may be multiple other terminals in addition to 102-1 and 102-2.

Terminals 102-1 and 102-2 are shown coupled to the Internet 110. Of course, aspects of the invention may work with other networks. In one embodiment of the invention, the terminals are connected to a local area network and exchange data using a peer-to-peer protocol. An instant messaging server 112 is also shown coupled to the Internet 110. Instant messaging server 112 may include a user database 114 for performing conventional functions such as keeping track of when users are online, storing chat group member lists, and keeping track of which content is to be provided and automatically updated over the course of a particular real time communication. An updates database 118 may collect data from a variety of external services, representative examples of the latter including services 160-1 to 160-5. These include such sources of data as live stock ticker service(s) 160-1, live election reporting and/or polling service(s) 160-2, live auction bidding service(s) 160-3, live sports score service(s) 160-4, and weather service(s) 160-5. The updates database 118 may also collect data from internal services, such as location services from a mobile device 102-2 of each user.

Some of the services may provide notifications that updates are available for retrieval, in which case the instant messaging server 112 initiates a download and storage operation. As data is received from sources such as one or more of services 160-1 to 160-5, they are stored in the updates database 118. In some embodiments, only the most recent updates are stored. Other services may provide an application program interface (API) by which updates are "pushed" to the instant messaging server 112. In some embodiments, only the most recent data acquired for a particular real time conversation via the services 160-1 to 160-5 is stored in the updates database. In other embodiments, the updates are stored in a time-indexed manner so that when a user scrolls backwards in time over a particular conversation, the automatically updated data presented via the applicable user interfaces as interfaces 106 and 108 reflects the data as presented contemporaneously with the instant message(s) being exchanged between the real time conversation participants.

In an embodiment, system 100 further includes a local services database 116. The local services database gathers data of interest to subscribers of the instant messaging service implemented by server 112, where the data of interest is not economically available from a commercially affordable source but may nonetheless be obtained by access to one or more publicly available and reliable data sources.

While two or more users are exchanging messages as part of a real time communication session, the user interfaces 106 and 108 display periodically updated content delivered by the aforementioned services 160-1 to 160-5 in addition to the exchanged messages. In some embodiments, the user database associates certain content updating functionality with one or more groups of users so that the updated content is presented to these users without a need for any of the users in the group to invoke the capability. Such an association is specified, in one embodiment, as a default preference in the user account profile of one of the users taking part in a communication session. For example, a user may specify that when he or she initiates a communication with one or more other users identified in a list (e.g. a "buddy" list) during the hours when shares of their employer's company are trading, a particular update capability for displaying the current share price is invoked.

A group of users, according to another embodiment, may subscribe to a particular user group such that one or more update capabilities are specified in a group profile and applied to all messages associated with that group identity. By way of example, a group of friends who happen to be the fans of a particular baseball, soccer, hockey, or football team may specify that during the applicable season, updates and/or the last available data from a particular sporting event are presented to those users of the group actively participating in a conversation.

Instant messaging server 112 may include additional components for performing conventional instant messaging functions. Moreover, the functions of databases 114, 116, and 118 may be combined and performed by a single database or performed by other databases. In one alternative embodiment, an instant messaging server does not include databases and other modules for performing update functions. An instant messaging client application may be configured to coordinate the aggregation of data with both an instant message server and one or more separate content update service(s)/server(s). One skilled in the art will appreciate that numerous servers may be included to perform different instant messaging and automatic content updating functions. The servers may be configured to aggregate data between each other and/or an instant messaging client application may be configured to aggregate data from some or all of the servers.

Figure 2:
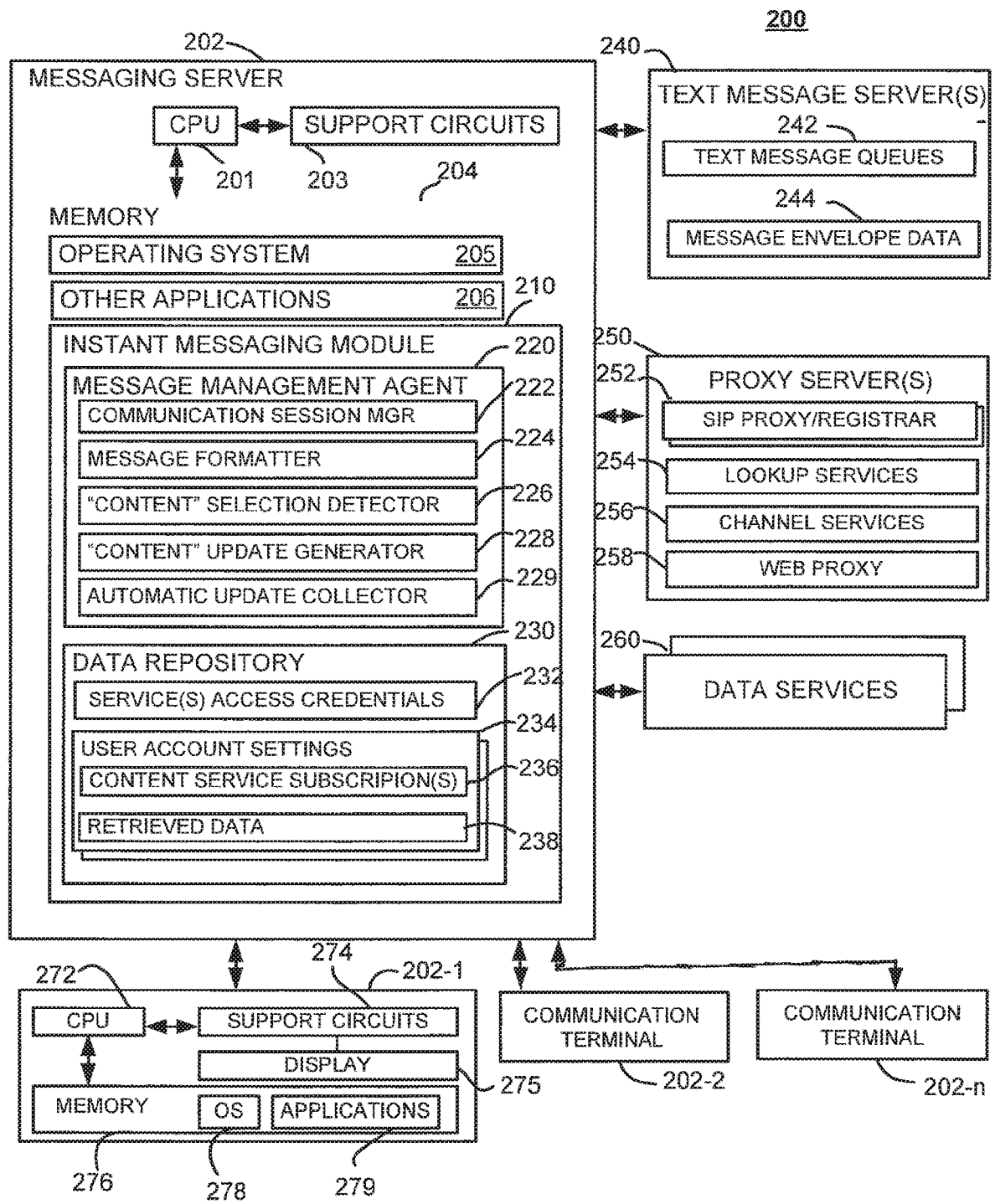
FIG. 2 is a block diagram depicting components of a communication system, with functional elements of the components being included to show interactions in support of automatic content updating within messages of a conversation, according to one or more embodiments of the invention.

FIG. 2 is a block diagram depicting, in greater detail, the interaction between functional components in an instant messaging system 200 comprising a messaging server 202. In some embodiments, the messaging server 202 includes one or more text messaging servers 240 and one or more proxy servers 250. The various components of system 200, including messaging server 202, and communication terminals 202-1 to 202-$n$, are connected by one or more network links. Some of the links are established by a network, such as a Wide Area Network (WAN) or Metropolitan Area Network (MAN), which includes a communication system that connects computers (or devices) by wire, cable, fiber optic and/or wireless link facilitated by various types of well-known network elements, such as hubs, switches, routers, and the like. The network interconnecting some components may also be part of a Local Area Network (LAN) using various communications infrastructure, such as Ethernet, Wi-Fi, a personal area network (PAN), a wireless PAN, Bluetooth, Near field communication, and the like.

Figure 6:
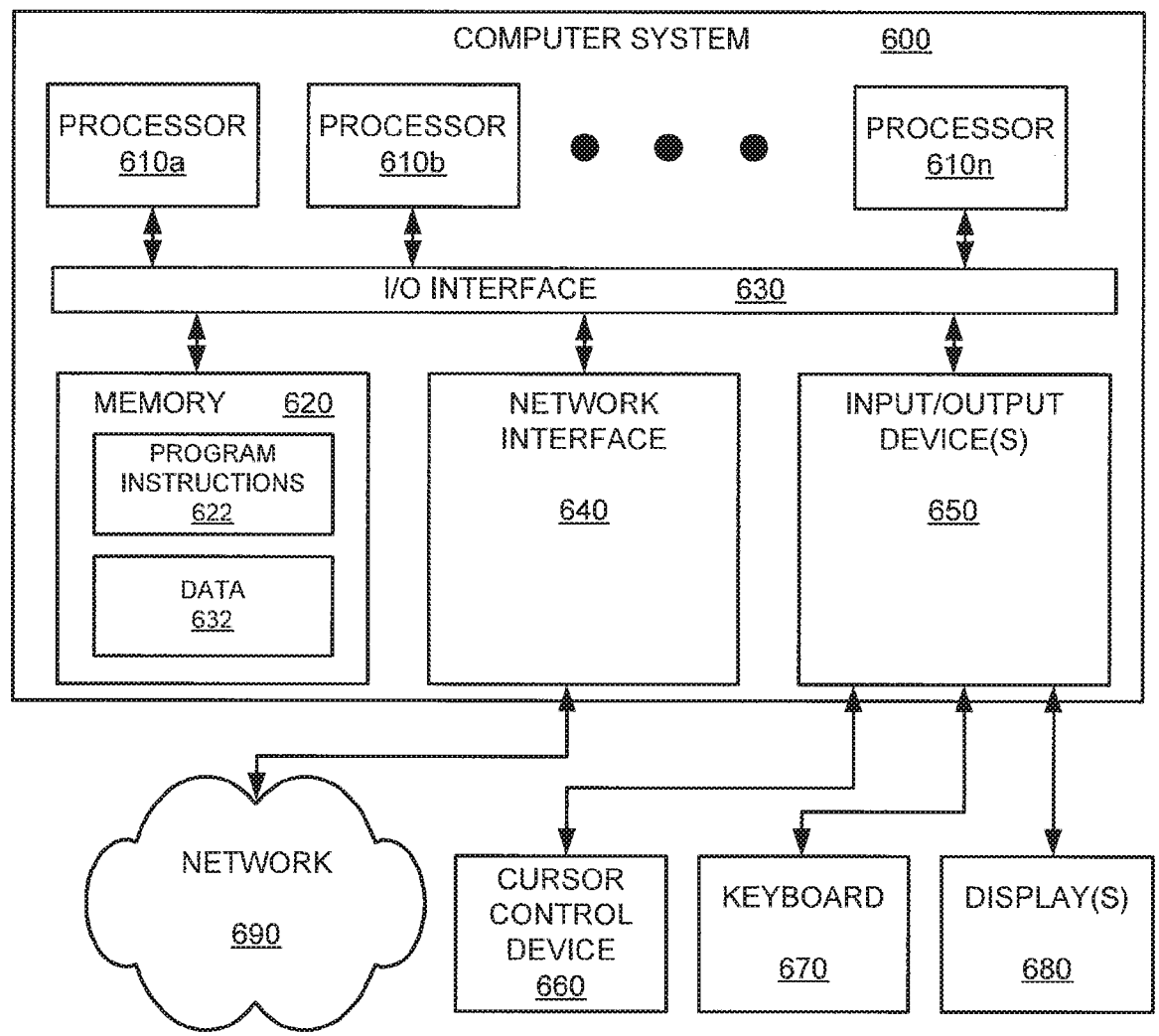
FIG. 6 is a detailed block diagram of a computer system, according to one or more embodiments.

The servers 202, 240 and 250 are each a computing device, or may be the same computing device as, for example, a desktop computer, laptop, tablet computer, and the like, or they may be cloud based servers e.g., a blade server, virtual machine, and the like. One example of a suitable computer is shown in FIG. 6, which will be described in detail shortly. For each provisioned text messaging, SMS or MMS messaging client, which may accommodate one-to-one, one-to-many, and multiple participant "group" chat message exchanges, text messaging server 240 maintains a message queue 242 and message envelope information 244 identifying a message originator's network address, a recipient's network address, the date and time of delivery to each recipient and/or to a group chat "room", and user account settings including rules and preferences defined by the user.

According to one or more embodiments, Proxy server(s) 250 provides sender and recipient (and/or group) directory lookups as needed to support the exchange of messages between communication terminal endpoints. In some embodiments, proxy server 250 is a SIP proxy server comprising a SIP/Proxy registrar 252, lookup services 254, and channel services 256 which collectively manage processes for authenticating users and managing the exchange of messages between endpoint communication terminals According to some embodiments, messaging server 202 includes an instant messaging module 210 comprising a set of instructions residing in memory 204 and executable by a Central Processing Unit (CPU) 201. The CPU 201 may include one or more commercially available microprocessors or microcontrollers that facilitate data processing and storage. Various support circuits 203 facilitate the operation of the CPU 201 and include one or more clock circuits, power supplies, cache, input/output circuits, and the like. The memory 204 includes at least one of Read Only Memory (ROM), Random Access Memory (RAM), disk drive storage, optical storage, removable storage and/or the like.

In addition to instant messaging module 210, memory 204 includes an operating system 205, and a plurality of applications which may optionally include a speech-to-text converter (not shown). The operating system (OS) 205 generally manages various computer resources (e.g., network resources, file processors, and/or the like). The operating system 205 is configured to execute operations on one or more hardware and/or software modules, such as Network Interface Cards (NICs), hard disks, virtualization layers, firewalls and/or the like. Examples of the operating system 205 may include, but are not limited to, LINUX, MAC OSX, BSD, UNIX, MICROSOFT WINDOWS, and the like.

In some embodiments, server 202 interacts with a plurality of communication terminals 202-1 to 202-n via a communication network. Each of the communication terminals, as 202-1 also includes one or more processors as CPU 272, support circuits 274, and a memory 276 containing an operating system 278 and applications 279. Also associated with the communication terminal 202-1 in some embodiments is a display device (not shown) which may comprise a touch screen able to accept input from a user's finger or input from a stylus. In some embodiments, applications 279 include a communication session module configured, by execution of instructions by CPU 272, to set up a telephone call or send an SMS, IM chat, or MMS message to an intended recipient via the communication network.

Instant messaging module 210 includes a message management agent 220 comprising a communication session manager 222 for directing the exchange of messages between the server 202 and the communication terminals 202-1 to 202-n, and a message formatter 224 for segmenting the user interface into separate windows for display of exchanged messages forming a real time conversation on the one hand, and dynamically and/or automatically updated content on the other hand, respectively. In the latter regard, message management agent 220 further includes a content selection selector 226 for determining a user's selection of a "sticker" corresponding to the specific content to be automatically updated and presented to participants in an applicable real time conversation via the second window of the user interface. In some embodiments, a "sticker" may be a display object that is displayed in association with a message session. According to the determined selection made by selector 226, a content update collector 229 of the message management agent 220 retrieves and/or receives content updates from one or more data services 260 which may be external services and/or internal services as described in connection with FIG. 1. Content update generator 228, in turn, initiates the display of the updated data by sending the update(s) to the terminals 202-1 to 202-n of the real time conversation participants.

To facilitate the reformatting of the user interface and provide automatically updated content along with the messages being exchanges among two or more participants in a real time conversation, instant messaging module 210 of system 200 further includes a data repository 230 which contains, in some embodiments, credentials used to establish authenticated access with one or more external data services forming at least part of data services 260, and user account settings 234. The user account settings 234 may include a specific subset of updateable content of potential interest to a user or group of users. In some embodiments, such as where a commercial database is the source of the data being used to provide the updates, user account settings 234 further includes one or more content service subscriptions 236 selected by the user and also one or more profiles 238 as a profile specifying the user's zip code, one or more "subscribed" messaging groups or buddy lists with which a specific data update capability or set of update capabilities are associated, and the like. In some embodiments, data repository 230 further includes the data updates (i.e., retrieved data 238) received from the data services 260.

In an embodiment, the retrieved data updates 238 within data repository 230 includes not only the last (e.g., final) data update associated with a particular event, but also any other data update(s) contemporaneous with a message sent by at least one conversation participant to the other participant(s) in a conversation. Thus, for example, if a plurality of data updates relate to intermediate (non-final) polling results for a particular election (i.e., based on the number of precincts reporting), then the retrieved data updates 238 may include all polling results which can be matched to a contemporaneous instant message that was originated by a participant in a conversation that invoked the applicable update service.

Figure 3:
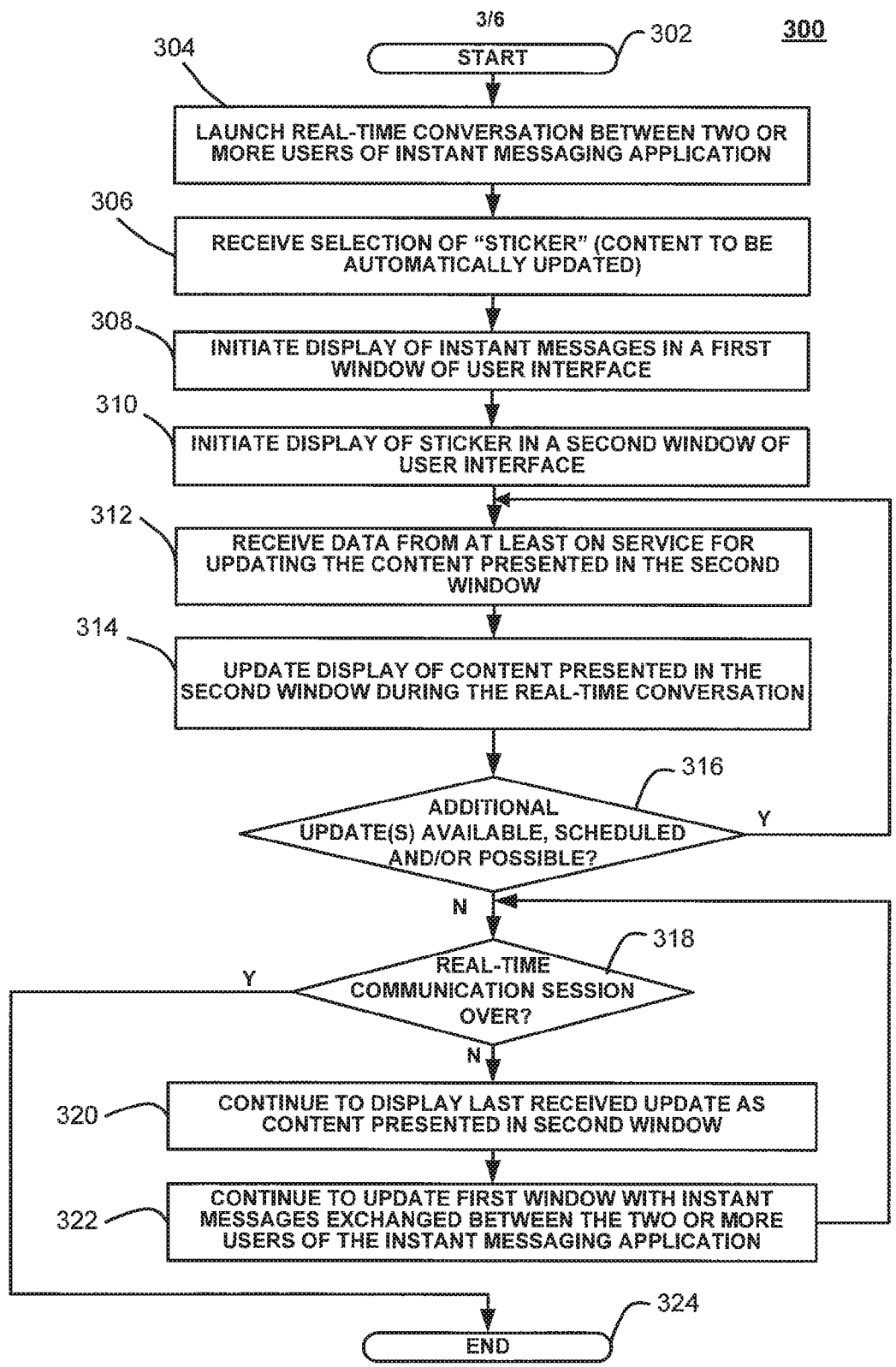
FIG. 3 is a flow diagram of a method for managing the presentation of automatically updated content together with messages forming part of a real time conversation between two or more participants, according to one or more embodiments of the invention.

FIG. 3 is a flow diagram of a method 300 for managing the presentation of automatically updated content together with the exchange of messages between participants in a real-time. The method 300 starts at 302, and generally proceeds to 304.

At 304, a real-time conversation is launched between two or more users of an instant messaging application. In some embodiments, launching a real-time conversation between two or more users of an instant messaging service includes establishing and/or commencing a messaging session, such as an instant message session, between at least two users. For example, a first user may send and/or receive (i.e., exchange) messages with one or more other uses to commence an instant messaging session via a user interface. In an embodiment, the method proceeds to 306 where a selection of content to be automatically updated is received. The selection may be received as a request to invoke the updating capability by one of the users. Alternatively, an established "chat group" of users may have previously specified the selection to be invoked each time an active conversation is in process. In embodiments, each participant in a real-time conversation uses an instant messaging client or a browser application to invoke a graphic user interface (GUI) presented via the display of a communication terminal.

Typically, the GUI comprises a message editing window presented via the display, and it may further include a menu displayed for the purposes of identifying and/or selecting the network address and/or username/handle of the intended recipients or group for which the message is intended. Other information rendered to the display as part of the menu may, for example, comprise the name of the intended recipient(s) or group(s), a list of phone numbers, SIP addresses, and/or e-mail addresses stored in a local memory of the communication terminal and applicable to the intended recipient. In such embodiments, method 300 may be implemented entirely by a mobile terminal such, for example, as a smartphone, personal digital assistant (PDA), tablet, laptop computer, or the like. In other embodiments, some or all of the information accessed for display of the menu may be stored at a server, wherein the menu invoked by the GUI constitutes part of a communication client application as, for example, an application configured to initiate message exchanges, as well as telephone conversations, handled by a remote server.

The method 300 proceeds to 308, where instant messages authored by the respective conversation participants are forwarded to the other participants so as to initiate their display by the terminals of those users. In some embodiments, the user interface is formatted so that the instant messages comprising a conversation are presented in a text viewing (or "first") window or region of the GUI. When an event being monitored in connection with the selection received at 306 begins, or has a change in status, data associated with the event and/or change in status is also forwarded, as data updates, to the conversation participants. In one or more embodiments, the data updates are also presented within the text viewing window. For example, the data updates may be presented as one or more embedded "stickers"—in the same way as emoticons are presented—within or aligned with the text presented in the message viewing window. In other embodiments, the updates may be presented within a separate (e.g., a "second") window or region of the GUI so that the data update remains in a fixed position even as new text is added to the viewing window or as the user scrolls back to review earlier parts of a conversation.

In some embodiments, the presentation of data updates is synchronized so that as a user scrolls backwards to review earlier portions of a conversation within the first window, the data previously presented as real-time or delayed updates during respective parts of a conversation via, for example, the first and/or the second window, is "rolled back" so that it reflects the status or details of an event as it was at the time the earlier portions were generated and/or received by the conversation participant(s).

In some applications, the event(s) subject to automated updating consistent with the present disclosure has or have a known or projected start time, end time and duration. Examples of such events include, for example, a sporting event, or stock market trading day in which shares of a particular company's shares are traded during prescribed normal, pre-market or post-market trading hours. In other applications, the event itself may have an indeterminate start or end time. In the latter regard, a user may receive a credit as a birthday present or the like, wherein the content might take the form of an animated image which has a dynamic attribute until it is accepted, acknowledged and/or used by the recipient, which it point it is updated to reflect the change in status. In accordance with one or more embodiments, both the sender and the recipient (and any other participants to whom the update is addressed as part, for example, of a conversation) need only review the conversation to check on the current status of the transaction.

In yet another example, mobile users may participate in a running competition against one another. Real-time information such as longest distance or best time may be retrieved from, for example, location data determined from each mobile device for each participant. The sticker may display, for example, "Current best runner is Sue with a distance of 8.2 miles!"

As yet another example, one user of an instant messaging application might invoke a "call me back" function in connection with a real-time conversation by embedding a "sticker" at an appropriate juncture. As in the previous example, until accessed and acted upon by the invitee, the "sticker" might be visually presented in an animated format to communicate the need for action on the part of the invitee, such that every time the invitee reviews the particular part of a conversation with which the invocation of the "call me back" function was contemporaneous, he or she will be reminded that the requested action remains to be taken. In some embodiments, by clicking on the animated icon, a call is automatically set up by a communication server associated with messaging server 202, and the status of the animated icon is updated (i.e., by transition to a quiescent or static state) to signify to all parties to the conversation that the requested action has been performed.

In any event, and with continued reference to FIG. 3, it will be seen that following display of the initial content contemporaneous with the exchange of messages, data is received at 312 for updating the content presented together with one or more messages of a conversation. In some embodiments, the data is received from at least one of an internal data service or an external data service. In other embodiments, the data is received from a state monitoring agent that tracks the performance of an invitee user action to support the functionality discussed above. At 314, the display content within the second window is updated and the method proceeds to 316.

At 316, a determination is made as to whether additional updates are expected (e.g. scheduled or possible in view of the time of day, location, occurrence of another event, etc.). If so, the method 300 returns to 312 and waits for and/or receives the next update according to the flow previously described. The manner in which data updates are provided to and/or acquired by operation of method 300 admits of substantial variation. In some embodiments, at least some updates are pushed from a server, as a service, to all devices registered to receive the data. In other embodiments, at least some updates are obtained as part of an active request process. In one embodiment, credentials establishing that a request is authorized and within the scope of a license to receive the data updates are submitted to an administration and authentication server. Upon successful completion of the authentication process, one or more requested updates are downloaded from an update server to the requesting device. If no additional updates are anticipated or determined to be available at 316, the method 300 proceeds to 318.

At 318, a determination is made as to whether the communication session is over. If so, the method 300 advances to 324 and terminates. Otherwise, the method proceeds to 320, where the last received update is caused to be displayed in the second window of the user interface and to 322, where the first window continues to be updated with additional messages as they are generated and exchanged between the users.

Figure 4:
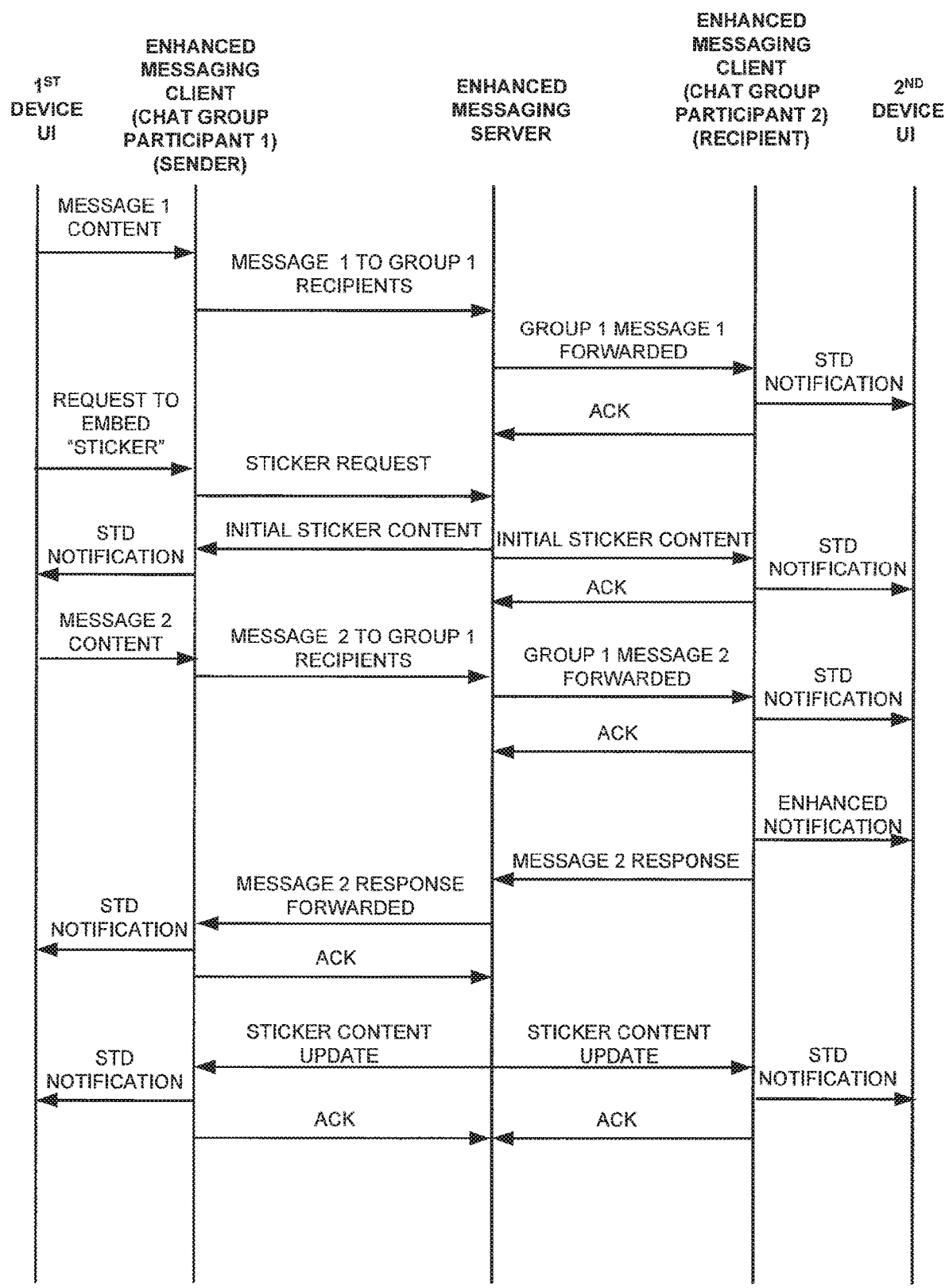
FIG. 4 is a message flow diagram depicting the development, flow and processing of automatic data updates and messages for presentation to participants in a real time conversation in accordance with one or more embodiments of the present invention.

In embodiments exemplified by FIG. 4, a series of messages originate at a first communication terminal device on which an enhanced messaging client is executed by a processor. The messages are intended to be accessed and reviewed by a group of users ("Group 1") which includes the user of a second communication terminal device on which an enhanced messaging client is executed by a processor. The first two messages ("Message 1" and "Message 2") are directed to all chat group participants.

In the example of FIG. 4, the user of the first communication terminal invokes an automatic data update capability associated with a "sticker" which may correspond to an event for which at least one change in status is expected from the time at which the invocation is made in the course of a "conversation" comprising an exchange of messages between two or more participants. When a change in status finally occurs, the participants (including participants 1 and 2) of the conversation receive the update. In some embodiments, the participants may acknowledge the update.

Figure 5A:
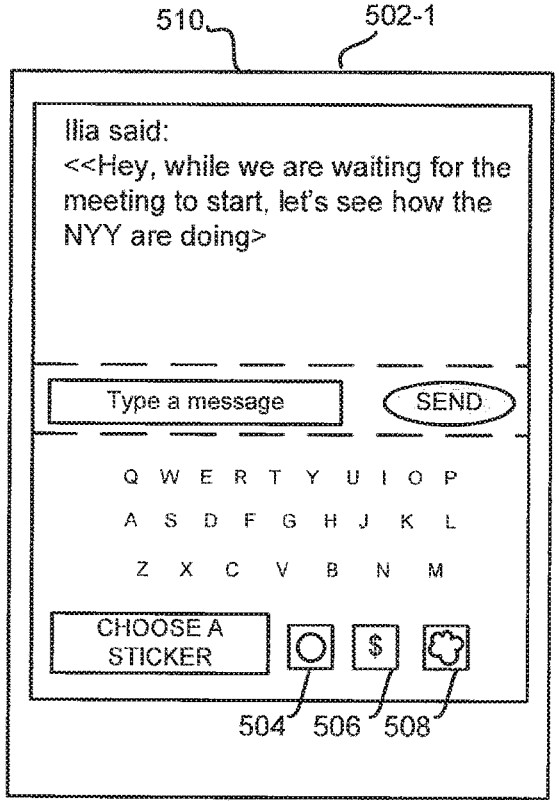
FIG. 5A depicts a communication terminal operated by a user to visually present a sequence of messages forming at least part of a first message exchange between two or more participants and to invoke an automatic data update and presentation capability for enhancing the experience of all participants, according to one or more embodiments of the invention.

FIG. 5A depicts a communication terminal 502-1 operated by a user to visually present a sequence of messages forming at least part of a first message exchange between two or more participants and to invoke an automatic data update and presentation capability for enhancing the experience of all participants, according to one or more embodiments of the invention. The sequence of messages are rendered to a display 510, which also provides a text editor window for the user of communication terminal 502-1 to enter the text of a message and to invoke the aforementioned automatic update capability by the selection of one of a plurality of options in the form of a message object 504, 506, 508 corresponding to different genre. In the example of FIG. 5A, object 504 refers to a sporting event genre, object 506 refers to a financial genre, and object 508 refers to a national weather genre.

In some embodiments, lists of supported update services available are tailored intelligently to a residence location, characteristic, capability and/or attribute of the user. In one embodiment, for example, the zip code set forth in the user's account profile 234 (FIG. 2) of the user may be used to select, for presentation as listed options selectable by the user, one or more of a list of local sports team data, current and forecast regional and/or local weather data. Alternatively or in addition, if the user profile specifies the user's employer, a list of available update services may include the share price of the user's employer and/or the employer's competitors.

Figure 5B:
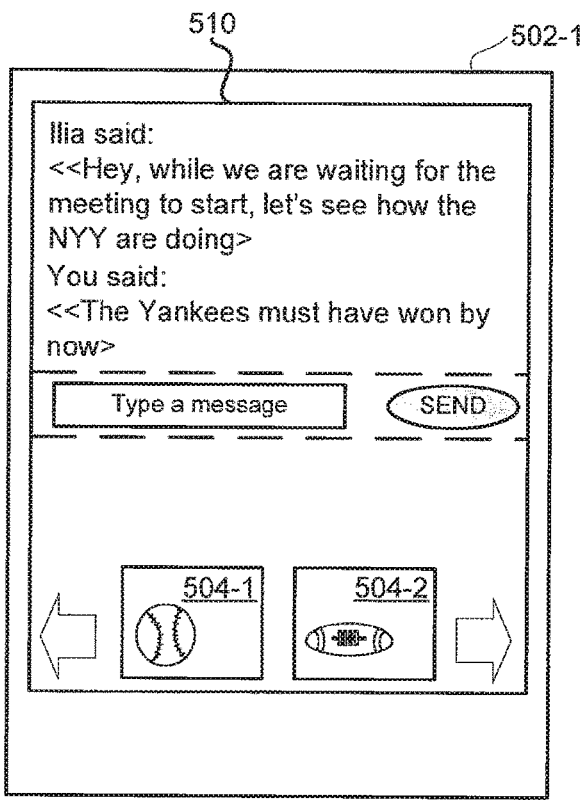
FIG. 5B depicts the communication terminal of FIG. 5A following the processing of received message content and corresponding tag(s) to generate a reformatted presentation of the message content based on a single included tag, according to one or more embodiments of the invention.

FIG. 5B depicts the communication terminal 502-1 of FIG. 5A following the selection of one of the data update options (the sport genre in the present example), which enables the user to scroll horizontally past a series of sports (e.g., baseball at 504-1, football at 504-2, as well as soccer, golf, tennis and the like) according to one or more embodiments of the invention. In addition, more than one sticker may be selected such that a plurality of real-time information is displayed to the communication terminal. In the embodiment depicted, the user of terminal 502-1 can at any time view text messages from the other participants via a separate window and respond to them.

Figure 5C:
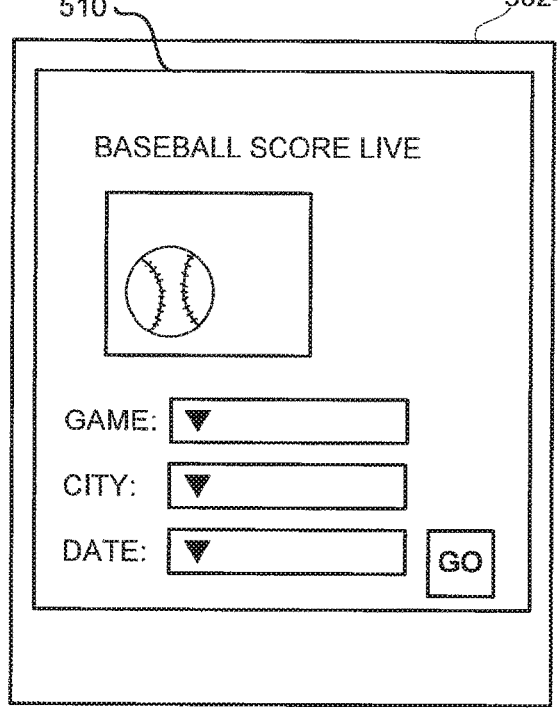
FIG. 5C depicts the communication terminal of FIGS. 5A and 5B operated by a user to visually present a sequence of messages forming at least part of a second message exchange between two or more participants and to create, edit or forward a message containing a plurality of tags for enhancing the user experience of a recipient, according to one or more embodiments of the invention.
Figure 5D:
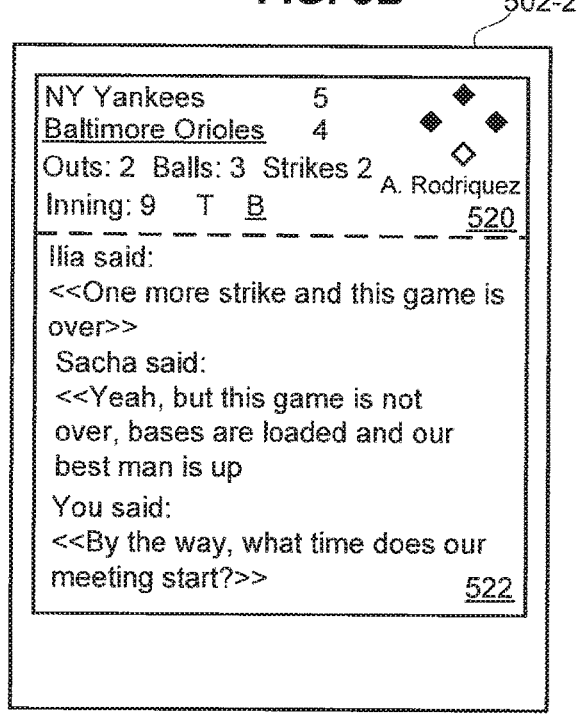
FIG. 5D depicts a recipient communication terminal participating in the exchange presented on the display shown in FIG. 5C and following the processing of received message content and corresponding tags to generate a reformatted presentation of the message content based on a plurality of included tags, according to one or more embodiments of the invention.

FIG. 5C depicts the communication terminal 502-1 of FIGS. 5A and 5B operated by a user to visually present a data entry screen of the user interface for a user of terminal 502-1 to enter the data needed for tracking a specific event. FIG. 5D depicts a recipient communication terminal 502-2 participating in the exchange presented on the display shown in FIGS. 5A and 5B, but with the inclusion of a separate second window 520 depicting the most recent data for the baseball game selected by the user of terminal 502-1 (FIG. 5C), in addition to the first window 522 depicting the messages exchanged by the users. Although a separate window 520 is shown, as noted previously, the data updates may be embedded within the text viewing/editor window in the same manner as an emoticon.

Additional embodiments include, for example, call queue management. In such embodiment, a customer may initiate, for example a service call (e.g., a video call or chat session) to a service agent. An updated content display similar to that in FIG. 5D depicts an actual wait time that is updated in real-time until the customer is connected to the service agent.

In another embodiment, during a service call to service agent, diagnostic tools are integrated into one or more stickers. The diagnostic details of a first diagnostic sticker are updated for the customer, where details may include connection speed, LAN status, a network connectivity map, and the like. Similarly, the service agent on the call may see metrics collected by a second diagnostic sticker, where metrics may include phone model, free space, battery power, screen brightness, GPS location, and the like. As such, each sticker causes disparate information to be displayed and updated on each communication terminal involved in the messaging session.

In another exemplary embodiment, delivery order status data is displayed. For example, for a pizza delivery, the status of the delivery is updated as order progresses. In such example, the status update messages may include "Preparing pizza", "in Oven", "Out for Delivery", "0.5 miles from your location", "Delivered", and the like. In some embodiments, the location of the delivery person may be displayed on a map and updated periodically, for example when a status change is detected. In other embodiments related to a delivery service, appropriate status update messages for the type of delivery are displayed. In such embodiments, the delivery service registers with the messaging server to deliver the real-time information to the messaging server, which in turn forwards the updated status data to the device of the user. The sticker remains present until the order is delivered.

In yet another embodiment, the updated information details pertain to an item selected on a communication terminal. For example, a customer may participate in an interactive communication session to plan a vacation with, for example a sales person. When choosing a hotel, the sales person may select a hotel, causing details about the hotel to be sent for display. Such details may include price, distance from major attractions, images of the rooms and facilities, and the like. As different hotels are selected for discussion by the sales person, the display information is updated with the details of the hotel currently being discussed. In such embodiments, the sales person controls the presented data as the sales person presents the user with the available options.

The embodiments of the present invention may be embodied as methods, apparatus, electronic devices, and/or computer program products. Accordingly, the embodiments of the present invention may be embodied in hardware and/or in software (including firmware, resident software, microcode, and the like), which may be generally referred to herein as a "circuit" or "module". Furthermore, embodiments of the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of embodiments of the present invention may be written in an object oriented programming language, such as Java.®, Smalltalk or C++, and the like. However, the computer program code for carrying out operations of embodiments of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit embodiments of the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

FIG. 6 is a detailed block diagram of a computer system, according to one or more embodiments, that can be utilized in various embodiments of the present invention to implement the computer and/or the display devices, according to one or more embodiments.

Various embodiments of method and apparatus for organizing, enhancing and presenting message content and associated notifications, as described herein, may be executed on one or more computer systems, which may interact with various other devices. One such computer system is computer system 600 illustrated by FIG. 6, which may in various embodiments implement any of the elements or functionality illustrated in FIGS. 1-5D. In various embodiments, computer system 600 may be configured to implement methods described above. The computer system 600 may be used to implement any other system, device, element, functionality or method of the above-described embodiments. In the illustrated embodiments, computer system 600 may be configured to implement method 300 (FIG. 3), and/or method 400 (FIG. 4) as processor-executable executable program instructions 622 (e.g., program instructions executable by processor(s) 610) in various embodiments.

In the illustrated embodiment, computer system 600 includes one or more processors 610a-610n coupled to a system memory 620 via an input/output (I/O) interface 630. Computer system 600 further includes a network interface 640 coupled to I/O interface 630, and one or more input/output devices 650, such as cursor control device 660, keyboard 670, and display(s) 680. In various embodiments, any of the components may be utilized by the system to receive user input described above. In various embodiments, a user interface may be generated and displayed on display 680. In some cases, it is contemplated that embodiments may be implemented using a single instance of computer system 600, while in other embodiments multiple such systems, or multiple nodes making up computer system 600, may be configured to host different portions or instances of various embodiments. For example, in one embodiment some elements may be implemented via one or more nodes of computer system 600 that are distinct from those nodes implementing other elements. In another example, multiple nodes may implement computer system 600 in a distributed manner.

In different embodiments, computer system 600 may be any of various types of devices, including, but not limited to, a personal computer system, desktop computer, laptop, notebook, or netbook computer, mainframe computer system, handheld computer, workstation, network computer, a set top box, a mobile device such as a smartphone or PDA, a consumer device, video game console, handheld video game device, application server, storage device, a peripheral device such as a switch, modem, router, or in general any type of computing or electronic device.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments processors 610 may be general-purpose or embedded processors implementing any of a variety of instruction set architectures (ISAs). In multiprocessor systems, each of processors 610 may commonly, but not necessarily, implement the same ISA.

System memory 620 may be configured to store program instructions 622 and/or data 632 accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 620. In other embodiments, program instructions and/or data may be received, sent or stored upon different types of computer-accessible media or on similar media separate from system memory 620 or computer system 600.

In one embodiment, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices attached to a network (e.g., network 690), such as one or more display devices (not shown), or one or more external systems or between nodes of computer system 600. In various embodiments, network 690 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 640 may support communication via wired or wireless general data networks, such as any suitable type of Ethernet network, for example; via telecommunications/ telephony networks such as analog voice networks or digital fiber communications networks; via storage area networks such as Fiber Channel SANs, or via any other suitable type of network and/or protocol.

Input/output devices 650 may, in some embodiments, include one or more communication terminals, keyboards, keypads, touchpads, scanning devices, voice or optical recognition devices, or any other devices suitable for entering or accessing data by one or more computer systems 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

In some embodiments, the illustrated computer system may implement any of the methods described above, such as the methods illustrated by the flowchart of FIG. 3. In other embodiments, different elements and data may be included.

Those skilled in the art will appreciate that computer system 600 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

What is claimed is:

1. A method of providing automatically updated content in a messaging session, the method comprising:
   exchanging, via a user interface of a messaging system on a first user device, messages with one or more other user devices in the messaging session, wherein the user interface includes a first region for exchanging messages;
   initiating display of a plurality of selectable messaging objects that represent supplementary content in a second region of the user interface, wherein the supplemental content is automatically periodically updated during the messaging session;
   receiving a first user selection of one of the displayed messaging objects to include during the messaging session; and
   embedding the supplementary content associated with the selected messaging object within the messaging session.

2. The method of claim 1, wherein the selection of the messaging object causes the content to be viewable by all participants in the messaging session.

3. The method of claim 1, wherein the embedded supplementary content is updated while the first user is communicating with the one or more other user devices in the message session in the first region.

4. The method of claim 1, wherein the supplementary content associated with the selected messaging object is presented in a second region of the user interface.

5. The method of claim 1, wherein the updated supplementary content associated with the selected messaging object is time-indexed.

6. The method of claim 5, wherein as previously displayed instant messages are viewed backwards in time, the embedded supplementary content that was contemporaneous with the instant messages is displayed.

7. The method of claim 3, wherein the updated supplementary content is displayed to less than all users engaged in the session.

8. The method of claim 3, wherein the updated supplementary content comprises a real-time wait time until a user is connected to a callee.

9. The method of claim 3, wherein the updated supplementary content displayed to the first user is disparate from the updated content displayed to the one or more other users.

10. The method of claim 1, wherein the updated supplementary content comprises messages indicating a delivery status.

11. The method of claim 10, wherein the updated supplementary content comprises a map depicting a current location of an item being delivered.

12. The method of claim 1, wherein the updated supplementary content comprises information details for an item discussed in a messaging session.

13. A system of providing automatically updated content in a messaging session, comprising:
   a) at least one processor;
   b) at least one input device; and
   c) at least one storage device storing processor executable instructions which, when executed by the at least one processor, perform a method including:
   exchanging, via a user interface of a messaging system on a first user device, messages with one or more other user devices in the messaging session, wherein the user interface includes a first region for exchanging messages;
   initiating display of a plurality of selectable messaging objects that represent supplementary content in a second region of the user interface, wherein the supplemental content is automatically periodically updated during the messaging session;
   receiving a first user selection of one of the displayed messaging objects to include during the messaging session; and
   embedding the supplementary content associated with the selected messaging object within the messaging session.

14. The system of claim 13, wherein the selection of the messaging object causes the content to be viewable by all participants in the messaging session.

15. The system of claim 13, wherein the supplementary content is updated while the first user is communicating with the one or more other user devices in the message session in the first region.

16. The system of claim 13, wherein the supplementary content associated with the selected messaging object is presented in a second region of the user interface.

17. The system of claim 13, wherein the supplementary content associated with the selected messaging object is time-indexed, and wherein as previously displayed instant messages are viewed backwards in time, the updated content that was contemporaneous with the instant messages is displayed.

18. The system of claim 15, wherein the updated supplementary content is displayed to less than all users engaged in the session.

19. The system of claim 13, wherein the updated supplementary content comprises a real-time wait time until a user is connected to a callee.

20. The system of claim 13, wherein the updated supplementary content displayed to the first user is disparate from the updated content displayed to the one or more other users.

21. The system of claim 13, wherein the updated supplementary content comprises messages indicating a delivery status, and wherein the updated content comprises a map depicting a current location of a delivery person.

22. The system of claim 13, wherein the updated supplementary content comprises information details for an item discussed in a messaging session.

* * * * *